July 22, 1969  F. REINIGER  3,457,406
HOLDER FOR FILM MAGAZINES OF VARYING
SIZES IN AN X-RAY APPARATUS
Filed June 8, 1967
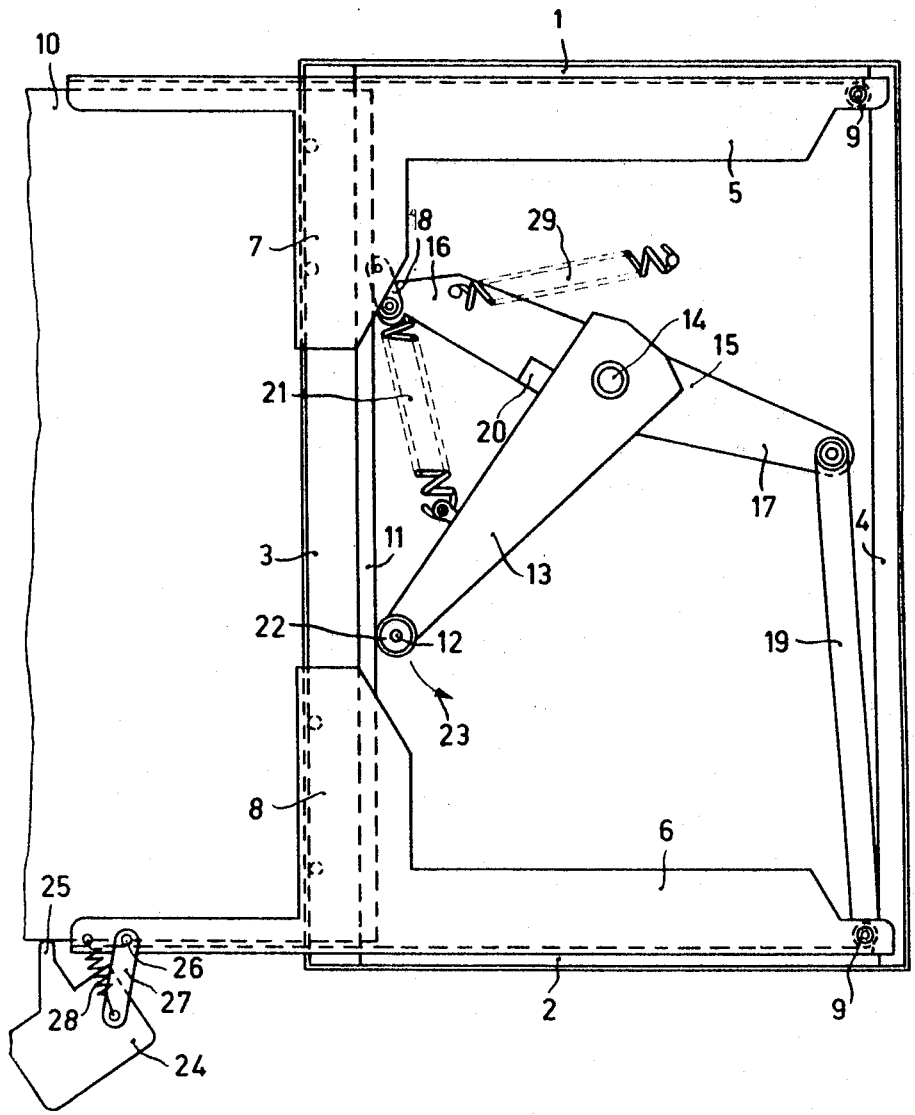
*INVENTOR.*
FRIEDRICH REINIGER
BY
*AGENT*

United States Patent Office 3,457,406
Patented July 22, 1969

3,457,406
HOLDER FOR FILM MAGAZINES OF VARYING SIZES IN AN X-RAY APPARATUS
Friedrich Reiniger, Hamburg-Sasel, Germany, assignor, by mesne assignments, to U.S. Philips Corporation, New York, N.Y., a corporation of Delaware
Filed June 8, 1967, Ser. No. 644,591
Int. Cl. G03c 3/00; G03b 17/26
U.S. Cl. 250—66          4 Claims

ABSTRACT OF THE DISCLOSURE

A self-adjusting film magazine holder with a linkage arrangement for flexibly mounting holding ledges, which ledges are movable so as to accommodate magazines of varying sizes therebetween. A releasable locking device is provided to maintain the magazine within the holder.

---

This invention relates to a device for holding film magazines in an X-ray apparatus.

It is known in X-ray apparatus to include devices for the film magazines which permit of taking photographs using films of different sizes. However, all known devices have the disadvantage that the mechanism for guiding the magazine is suitable only for the use of magazines of one specific size or only a few different sizes.

A device according to the present invention permits the use of magazines having arbitrary dimensions within wide limits. Such a device, which is used in X-ray apparatus to hold film magazines between a pair of parallel ledges, comprises a two-armed yoke which can pivot about a spindle and each free end of which is connected to one ledge so that, when the yoke is pivoted, the ledges move from their outermost positions simultaneously and to the same extent towards each other, an arm being arranged to pivot about the same spindle and being secured to the yoke via a resilient coupling and a second resilient member being active in a direction opposite to the pivotal movement of the yoke, the magazine when introduced from the side between the ledges causing displacement of the free end of the pivot arm, thus making the resilient coupling act as a driving element for pivoting the yoke.

The operation of the device is simplified especially due to only a groove along the edge being required for placing the magazine in position. The area occupied by the magazine need otherwise not be accessible. If an image intensifier and other apparatus for video observation, such as a cine camera or a television pick-up camera, are arranged at the front as is frequently already the case, it is no longer necessary to remove these apparatus for placing a film magazine in position. The introduced magazine is preferably locked against displacement in the opposite direction by a locking mechanism. The introduction of the magazine causes an increasing pressure on its due to the displacement of the pivot arm and this phenomenon is utilized for automatically removing the magazine by releasing the lock.

Helical springs can be used for the resilient coupling as well as for the second resilient member.

In order that the invention may be readily carried into effect, it will now be described in detail, by way of example, with reference to the accompanying diagrammatic drawing.

The holder for the film magazine comprises a frame formed by two pairs of opposing sides 1, 2 and 3, 4 respectively. Clamping ledges 5, 6 for example U-shaped are arranged along one pair of parallel sides 1, 2 and can slide along the other pair of parallel sides 3, 4. To this end, the ledges are provided with guides 7, 8 along the side 3 and with rollers 9 which engage the opposing side 4. A magazine 10 bears in the U-shaped ledges 5 and 6 when it has been introduced from the left-hand side and displaced adequately to the right. During this displacement the front side 11 of the magazine contacts the end 12 of an arm 13, which can pivot about a fixed spindle 14. Pivoted to this spindle is also a two-armed yoke 15 the two ends 16 and 17 of which are pivotally connected to the ledges 5 and 6 respectively. The arm 16 of the yoke is connected to the ledge 5 via a clasp 18, a coupling rod 19 being present between the ledge 6 and the end of the arm 17. The yoke 15 has a lateral abutment 20, which is engaged with slight pressure by the pivot arm 13 due to the tension in a spring 21 which couples the arm 13 to the yoke 15. When the arm 13 pivots about the spindle 14, the yoke 15 follows this movement and the ledges 5 and 6 approach each other. This displacement is opposed by a spring 29 which also ensures that, when the cause of a pivotal movement of the arm 13 is removed, the ledges 5 and 6 return to their outermost positions. It is thus possible to introduce magazines of any large size and also magazines of any arbitrary smaller dimensions.

Upon introducing the magazine 10, the end 12 of the arm 13 is pushed via a roller 22 fitted on it at right angles to the plane of the drawing, in the direction indicated by an arrow 23. Consequently the upper and lower ledges 5 and 6 are moved equally towards each other via the spring 21 on the one hand, and via the lever arm 17 and the coupling rod 19 on the other hand, until the magazine 10 is clamped above and below in position. The magazine 10 is pushed further and hence the spring 21 is tensioned, until a locking device 24 becomes active and a lock 25 snaps behind the magazine. Magazines of arbitrary sizes are thus centered in height and checked by the locking device at the left-hand side of the magazine holder.

The locking device 24, which is secured to the lower moveable ledge 6, may be secured to the two sides of the U-shaped ledge 6, for example, via a pair of arms 27 which can pivot about a spindle 26. A spring 28 ensures that the lock 25 occupies a rest position such that it projects above the ledge 6. When the lock 25 is pushed under the ledge 6, as shown in the figure, the magazine 10 is pushed away from the photographic position, by the arm 13 with its roller 22 and the tensioned spring 21.

What is claimed is:
1. A device used in an X-ray apparatus for arranging and holding film magazines between a pair of parallel ledges, characterized in that a two-armed yoke which can pivot about a spindle and each free end of which is connected to one ledge, is arranged in such a manner that, when the yoke pivots, the ledges are moved from their outermost positions simultaneously and to the same extent towards each other and an arm pivoted to the same spindle being secured to the yoke through a resilient coupling, and a second resilient coupling secured to the yoke being active in a direction opposite to the pivotal movement of the yoke, an introduction of the magazine from the side between the ledges causing displacement of the free end of the pivot arm, the resilient coupling thus acting as a driving element for pivoting the yoke.

2. A device as claimed in claim 1, characterized in that the position of the pivot arm relative to the yoke is determined through a cam on the yoke.

3. A device as claimed in claim 1 characterized in that a locking mechanism is connected to one ledge, the releasable lock of the mechanism protecting the introduced magazine against displacement in the opposite direction.

4. A device as claimed in claim 3, characterized in that the spring force pushing the pivot arm against the introduced magazine, is sufficient, after the lock has been released, to move the magazine automatically out of its clamped position between the ledges.

References Cited

FOREIGN PATENTS 1,362,137 4/1964 France.
1,363,678 5/1964 France.

ARCHIE R. BORCHELT, Primary Examiner

A. L. BIRCH, Assistant Examiner

U.S. Cl. X.R.

250—68

PO-1050
(5/69)

UNITED STATES PATENT OFFICE
CERTIFICATE OF CORRECTION

Patent No. 3457406  Dated July 22, 1969

Inventor(s) FRIEDRICH REINIGER

It is certified that error appears in the above-identified patent and that said Letters Patent are hereby corrected as shown below:

Col. 1, in the title, the following should be inserted:

--Claims priority, application German, July 9, 1966, M70177--

Signed and sealed this 3rd day of March 1970.

(SEAL)
Attest:

Edward M. Fletcher, Jr.
Attesting Officer

WILLIAM E. SCHUYLER, JR.
Commissioner of Patents